United States Patent [19]
Ochikoshi et al.

[11] Patent Number: 5,821,272
[45] Date of Patent: Oct. 13, 1998

[54] METHOD FOR POST-TREATMENT OF POLYOLEFIN RESIN PRE-EXPANDED PARTICLES

[75] Inventors: Shinobu Ochikoshi, Takasago; Hisatoshi Fukui, Toyonaka; Kyoichi Nakamura; Hideya Mizuike, both of Takasago; Naruhiko Akamatsu, Kanzaki-gun, all of Japan

[73] Assignee: Kaneka Corporation, Osaka, Japan

[21] Appl. No.: 339

[22] PCT Filed: Jun. 16, 1997

[86] PCT No.: PCT/JP97/02074

§ 371 Date: Jan. 20, 1998

§ 102(e) Date: Jan. 20, 1998

[87] PCT Pub. No.: WO97/48759

PCT Pub. Date: Dec. 24, 1997

[30] Foreign Application Priority Data

Jun. 20, 1996 [JP] Japan ..................................... 8-160046

[51] Int. Cl.⁶ ...................................................... C08J 9/22
[52] U.S. Cl. ................................. 521/58; 264/50; 264/53; 264/55; 264/DIG. 9; 521/60; 521/918
[58] Field of Search ................................ 521/58, 60, 918; 264/50, 53, 55, DIG. 9

[56] References Cited

U.S. PATENT DOCUMENTS

| 4,656,197 | 4/1987 | Yoshimura et al. | 521/58 |
| 4,777,000 | 10/1988 | Kuwabara et al. | 521/58 |
| 4,937,271 | 6/1990 | Akamatsu et al. | 521/58 |

FOREIGN PATENT DOCUMENTS

| 4-57838 | 2/1992 | Japan . |
| 6-65481 | 8/1994 | Japan . |
| 7-41595 | 2/1995 | Japan . |

*Primary Examiner*—Morton Foelak
*Attorney, Agent, or Firm*—Armstrong, Westerman, Hattori, McLeland & Naughton

[57] ABSTRACT

Post-treatment method of polyolefin resin pre-expanded particles comprising: introducing the polyolefin resin pre-expanded particles foamed by using an inflammable blowing agent into an extraction vessel filled with steam previously; feeding an additional steam into the extraction vessel; extracting the inflammable blowing agent gas from the polyolefin resin pre-expanded particles; discharging the resulting steam which contains the extracted inflammable blowing agent gas from the extraction vessel continuously or intermittently; and liquefying the steam to separate and recover the inflammable blowing agent gas. According to the post-treatment method of polyolefin resin pre-expanded particles, the inflammable blowing agent can be extracted from the pre-expanded particles in a short period of time and the extracted inflammable blowing agent can be re-used.

2 Claims, 1 Drawing Sheet

METHOD FOR POST-TREATMENT OF POLYOLEFIN RESIN PRE-EXPANDED PARTICLES

TECHNICAL FIELD

The present invention relates to a method of post-treatment of polyolefin resin pre-expanded particles, particularly the method of post-treatment of polyolefin resin pre-expanded particles expanded by the use of an inflammable blowing agent for eliminating a fear of spontaneous firing of the particles in the air.

BACKGROUND ART

As energy-absorptive articles for cars such as bumpers and core materials and as heat insulating materials, foamed articles produced, for example, through in-mold foaming method, by the use of polyolefin resin pre-expanded particles have been used.

The above-mentioned polyolefin resin pre-expanded particles are produced in general by charging a pressure-resistive vessel with resin particles and water, introducing a flon type blowing agent such as dichlorodifluoromethane or dichlorotetrafluoroethane under pressure, increasing the inside pressure of the vessel by heating to impregnate the resin particles with the blowing agent and then, releasing the particles to the atmosphere.

However, it is said there is a fear that the flon type blowing agent is diffused into the atmosphere and reaches the stratosphere, thereby resulting in destruction of the ozone layer, increasing a ratio of hazardous radioactive rays reaching the earth and resulting in occurrence of many deseases such as carcinoma cutaneum. Thus restriction of the use of the flon type blowing agent was set forth.

Therefore, recently, as a blowing agent, for example, aliphatic hydrocarbon gases such as propane, butane, pentane and hexane are replacing the flon type blowing agent.

However, in the case where the above-mentioned aliphatic hydrocarbon gas is used as the blowing agent, there is always a fear that, for example, when the produced pre-expanded particles are allowed to stand in the air, the aliphatic hydrocarbon gas released gradually from the pre-expanded particles is ignited on the surface of the particles due to static electricity or the like and the pre-expanded particles flame up (Japanese Unexamined Patent Publication No. 61-101539).

For safety in case where the aliphatic hydrocarbon gas having inflammability is used, there was proposed a post-treatment method in which the inflammable blowing agent in the pre-expanded particles is extracted by using an inert gas such as nitrogen gas, carbon dioxide gas or helium gas until the inflammable blowing agent reaches below a concentration of lower explosive limit and then the pre-expanded particles are released into the air (Japanese Examined Patent Publication No. 7-30201 and U.S. Pat. No. 4,937,271).

The above-mentioned post-treatment method is a method excellent in safety because the pre-expanded particles can be obtained without being burnt due to ignition of the blowing agent released from the pre-expanded particles, which is caused by a spark of static electricity on the surface of the pre-expanded particles.

However, the above-mentioned post-treatment method has a drawback that since it is difficult to separate, from the inert gas used, the inflammable blowing agent extracted from the pre-expanded particles, the inflammable blowing agent cannot be recovered and thus production cost becomes high.

The present invention was made in view of the above-mentioned prior art. An object of the present invention is to provide a post-treatment method of polyolefin resin pre-expanded particles, in which an inflammable blowing agent can be extracted from pre-expanded particles in a short period of time and the extracted inflammable blowing agent can be re-used.

DISCLOSURE OF THE INVENTION

The present invention relates to a post-treatment method of polyolefin resin pre-expanded particles comprising:

introducing the polyolefin resin pre-expanded particles foamed by using an inflammable blowing agent into an extraction vessel filled with steam previously;

feeding an additional steam into the extraction vessel;

extracting the inflammable blowing agent gas from the polyolefin resin pre-expanded particles;

discharging the resulting steam which contains the extracted inflammable blowing agent gas from the extraction vessel continuously or intermittently; and liquefying the steam to separate and recover the inflammable blowing agent gas.

BEST MODE FOR CARRYING OUT THE INVENTION

Figure 1:
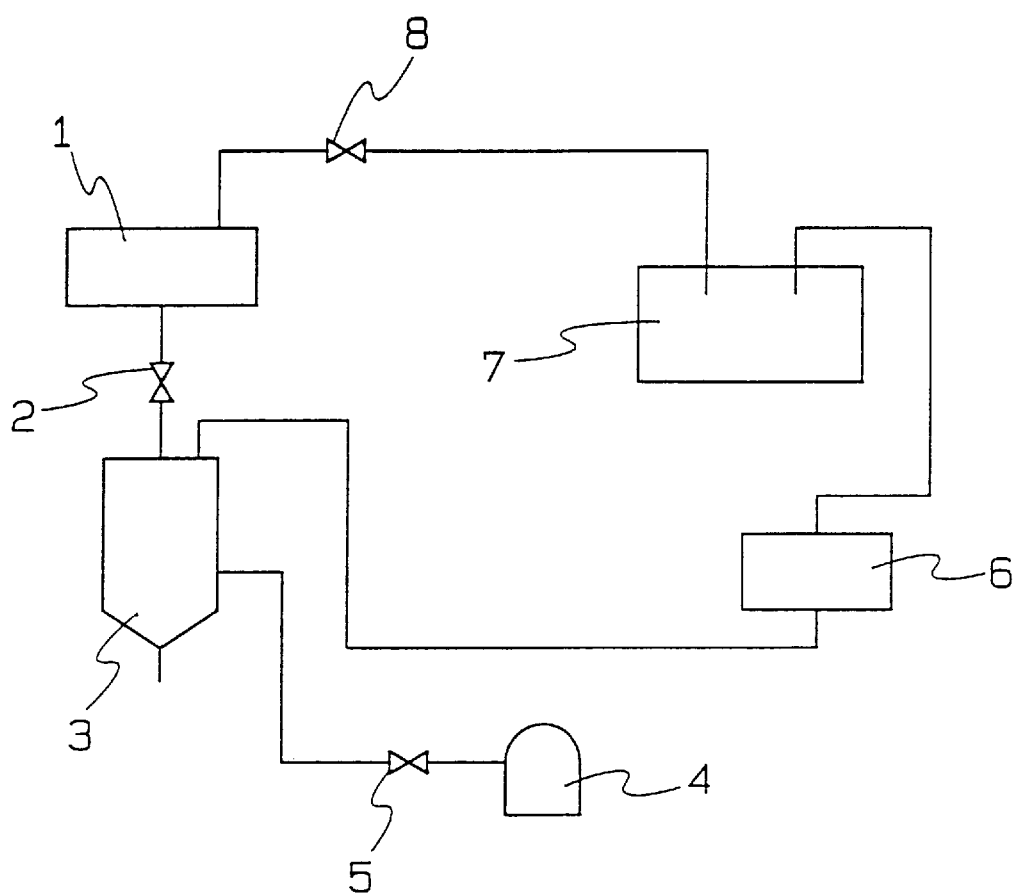
FIG. 1 is an explanatory view of the post-treatment method of the polyolefin resin pre-expanded particles according to the present invention.

According to the post-treatment method of the polyolefin resin pre-expanded particles of the present invention, as mentioned above, re-usable inflammable blowing agent can be obtained by:

introducing the polyolefin resin pre-expanded particles foamed by using an inflammable blowing agent into an extraction vessel filled with steam previously;

feeding an additional steam into the extraction vessel;

extracting the inflammable blowing agent gas from the polyolefin resin pre-expanded particles;

discharging the resulting steam which contains the extracted inflammable blowing agent gas from the extraction vessel continuously or intermittently;

and liquefying the steam to separate and recover the inflammable blowing agent gas.

Examples of the polyolefin resin which is a starting resin for polyolefin resin pre-expanded particles used in the present invention are, for instance, low density polyethylene, linear low density polyethylene, medium density polyethylene, high density polyethylene, ethylene-vinyl acetate copolymer, polypropylene, ethylene-propylene random copolymer, propylene-butene random copolymer, ethylene-propylene block copolymer, ethylene-propylene-butene terpolymer and the like. The polyolefin resins may be used alone or in admixture of two or more thereof.

If necessary, the polyolefin resin pre-expanded particles may be previously blended with, for example, nucleating agent such as talc, ultraviolet stabilizer, antistatic agent, antioxidant, flame retardant, coloring agent, filler and the like. As the polyolefin resin, resins crosslinked by means of peroxides or electron-beam can be used.

When producing the pre-expanded particles from the polyolefin resin, in order to make the pre-expansion easy, it is usually desirable to melt previously by using an extruder, kneader, Banbury mixer and rolls and then granulate into a desired shape such as cylindrical, ellipsoidal, spherical, cubic and rectangular parallelepipedic shapes so that an average particle size should be from 0.1 to 10 mm, preferably from 0.7 to 5 mm.

A pre-expansion method of the polyolefin resin is not particularly limited. There is, for example, a method comprising:

impregnating the polyolefin resin within a pressure-resistive vessel with an inflammable blowing agent represented by the aliphatic hydrocarbon blowing agent such as propane, butane, pentane or hexane;

dispersing the blowing agent-containing resin in water with stirring;

heating under pressure upto a specific expansion temperature; and releasing the dispersion into a low pressure area.

An amount of the inflammable blowing agent is not restricted particularly, and may be properly adjusted depending on a desired expansion ratio of the pre-expanded particles. The amount is usually from 5 to 50 parts (part by weight, hereinafter the same) on the basis of 100 parts of the polyolefin resin.

In preparing the above-mentioned dispersion, as dispersing agent, for example, inorganic dispersing agents such as calcium tertiary phosphate, basic magnesium carbonate, basic zinc carbonate and calcium carbonate can be used, and as surfactant, for example, sodium dodecylbenzenesulfonate, sodium n-paraffinsulfonate, sodium α-olefinsulfonate and the like can be used. Amounts of the dispersing agent and surfactant vary depending on their kinds and the kind and amount of the polyolefin resin used. The amount of the dispersing agent is usually from 0.2 to 3 parts on the basis of 100 parts of water, and the amount of the surfactant is usually from 0.001 to 0.3 part on the basis of 100 parts of water.

It is preferable that the polyolefin resin pre-expanded particles containing the inflammable blowing agent is added usually in an amount of from 20 to 100 parts on the basis of 100 parts of water to make good dispersion in water.

It is necessary to pay full attention to handling of the polyolefin resin pre-expanded particles containing the inflammable blowing agent because as mentioned above, when the particles get into contact with the air and sparking occurs due to, for example, static electricity on the surface of the particles, ignition and firing occur.

Therefore, it is preferable to put the produced pre-expanded particles immediately into an extraction vessel. It is preferable that the atmosphere inside a pipe to the extraction vessel and inside the vessel is replaced previously by steam not to cause the ignition even if sparking due to static electricity occurs on the surface of the pre-expanded particles.

It is preferable that an oxygen content in the steam is not more than 5% by volume in order to further increase effect of preventing ignition when sparking due to static electricity occurs on the surface of the pre-expanded particles. Also it is preferable that the oxygen content in the steam is not more than 1% by volume in view of re-use of the inflammable blowing agent.

In order to prevent the so-produced pre-expanded particles from getting into contact with the air, it is preferable that a production equipment of the pre-expanded particles is connected to the extraction vessel with a pipe or the like.

The extraction vessel is a vessel for extracting the inflammable blowing agent contained in the pre-expanded particles. There is no particular restriction with respect to such a vessel. Any vessel which resists to pressure and temperature of the steam supplied thereinto can be used. Example of the extraction vessel is, for instance, a cylindrical stainless steel vessel having a conical bottom shape.

It is desirable that a temperature of the steam to be additionally supplied to the extraction vessel is adjusted to a temperature range of not more than the melting point of the starting resin of the pre-expanded particles, preferably to 90° to 110° C.

It is desirable that a pressure of the steam to be additionally supplied to the extraction vessel is adjusted to a pressure of not more than a saturated steam pressure at the melting point of the starting resin of the pre-expanded particles, preferably to 0.7 to 1.5 kg/cm$^2$.

In view of eliminating a fear of ignition due to static electricity or the like when the pre-expanded particles are allowed to stand in the air, it is preferable that the extraction of the inflammable blowing agent from the pre-expanded particles in the extraction vessel is continued until the content of the inflammable blowing agent in the pre-expanded particles reaches not more than 0.5% by weight on the basis of the weight of the pre-expanded particles.

According to the method of the present invention, the inflammable blowing agent of not less than about 99% by weight in the pre-expanded particles is extracted only in about 20 minutes.

The steam containing the inflammable blowing agent gas extracted from the pre-expanded particles is discharged continuously or intermittently from the extraction vessel and then liquefied to separate and recover the inflammable blowing agent gas.

The steam containing the inflammable blowing agent gas discharged from the extraction vessel can be separated into the inflammable blowing agent gas and water, for example, by introducing the steam into a condenser and cooling at a temperature of not more than 30° C. to condense and liquefy to water. The inflammable blowing agent gas separated from water can be re-used as the blowing agent by collecting, for example, in a gas holder.

Then one embodiment of the post-treatment method of the polyolefin resin pre-expanded particles according to the present invention is explained by means of a drawing.

FIG. 1 is an explanatory view of the post-treatment method of the polyolefin resin pre-expanded particles according to the present invention.

In FIG. 1, the polyolefin resin pre-expanded particles are produced in a production equipment 1 and then fed to an extraction vessel 3 by opening a valve 2. In that case, it is preferable as mentioned above that before feeding the pre-expanded particles to the extraction vessel 3, steam is introduced previously into the extraction vessel 3 from a steam feeding unit 4 by opening a valve 5 to adjust an oxygen content in the extraction vessel 3 to not more than 1% by volume.

After the pre-expanded particles are fed to the extraction vessel 3, the valve 2 is closed, and the inflammable blowing agent is extracted from the pre-expanded particles with steam in the extraction vessel 3.

After the extraction of the inflammable blowing agent from the pre-expanded particles, steam contains the inflammable blowing agent. The steam containing the inflammable blowing agent is introduced into the condenser 6 and condensed by cooling to become water. The separated inflammable blowing agent gas from the condensed water is collected in a gas holder 7.

The inflammable blowing agent collected in the gas holder 7 is fed in any of gaseous form or liquid form liquefied by compression (an equipment for liquefying by compression is not shown in the drawing) into the production equipment 1 by opening a valve 8 and then re-used.

As mentioned above, according to the post-treatment method of polyolefin resin pre-expanded particles of the present invention, the inflammable blowing agent can be extracted safely and efficiently from the polyolefin resin pre-expanded particles containing the inflammable blowing agent. Further only water can be removed easily from the steam containing the inflammable blowing agent, thus providing an advantage that the inflammable blowing agent can be efficiently recovered and re-used.

The post-treatment method of polyolefin resin pre-expanded particles of the present invention is then explained by means of examples, but the present invention is not limited to them.

EXAMPLE 1

A cylindrical stainless steel vessel having a conical bottom shape (volume: 1.6 m$^3$) was used as the extraction vessel, and an oxygen content in the extraction vessel was adjusted to 0.1% by volume by introducing steam of 100° C. at 1.0 kg/cm$^2$ thereinto. The oxygen content was measured with an oxygen densitometer (PS-20 available from Shin Cosmos Denki Kabushiki Kaisha). Then 25 kg of pre-expanded particles which were produced by a polyolefin resin pre-expanded particles production equipment and contained an inflammable blowing agent, were fed to the extraction vessel. Physical properties of the pre-expanded particles used are shown in Table 1.

TABLE 1

| Physical properties of pre-expanded particles | |
|---|---|
| Average mass | 1.35 mg |
| Resin component | Ethylene-propylene random copolymer (Density: 0.9 g/cm$^3$, Melt index (MI): 9.0, Ethylene content: 4.5% by weight, Vicat softening point: 119° C.) |
| True density (particles expanded by 30 times) | 0.03 g/cm$^3$ |
| Content of inflammable blowing agent (isobutane) | 5 kg |

A true density is calculated by weighing a weight of pre-expanded particles (W: g) and measuring a volume (V: cm$^3$) of the pre-expanded particles in water, according to the following equation.

True Density (g/cm$^3$)=W/V

Then steam of 100° C. was fed into the extraction vessel to carry out extraction of the inflammable blowing agent from the pre-expanded particles. After a lapse of 20 minutes from starting of the feeding of steam, a content of the inflammable blowing agent in the pre-expanded particles was measured with an inflammable gas densitometer (PE-2-CC available from Shin Cosmos Denki Kabushiki Kaisha). The measured content was not more than 0.1% by weight.

Then the steam containing the inflammable blowing agent obtained in the extraction vessel was introduced intermittently into a condenser and cooled to 30° C. to liquefy the steam and separate the inflammable blowing agent therefrom. The inflammable blowing agent could be recovered at yield of not less than about 98%.

The content of the recovered inflammable blowing agent measured with the above-mentioned inflammable gas densitometer was 99.8% by weight.

Comparative Example 1

An inflammable blowing agent was extracted from pre-expanded particles in the same manner as in Example 1 except that an oxygen content in the extraction vessel was adjusted to 0.1% by volume by previously replacing the atmosphere in the vessel with nitrogen gas and that nitrogen gas of 100° C. was fed instead of steam of 100° C.

Then the inflammable gas was intended to be separated and recovered from the nitrogen gas which contained the inflammable blowing agent obtained in the extraction vessel, by using an activated charcoal absorption equipment, but could not be separated and recovered.

EXAMPLE 2

The same procedures as in Example 1 were repeated by using 25 kg of pre-expanded particles shown in Table 2, and after a lapse of 20 minutes from starting of the feeding of steam, a content of the inflammable blowing agent in the pre-expanded particles was measured in the same manner as in Example 1. The measured content was not more than 0.1% by weight.

Then the steam containing the inflammable blowing agent obtained in the extraction vessel was introduced intermittently into a condenser and cooled to 30° C. to liquefy the steam and separate the inflammable blowing agent therefrom. The inflammable blowing agent could be recovered at yield of not less than about 98%.

TABLE 2

| Physical properties of pre-expanded particles | |
|---|---|
| Average mass | 4.5 mg |
| Resin component | Linear low density polyethylene (Density: 0.93 g/cm$^3$, Melt index (MI): 2.0, Vicat softening point: 112° C.) |
| True density (particles expanded by 35 times) | 0.0266 g/cm$^3$ |
| Content of inflammable blowing agent (isobutane) | 6 kg |

Comparative Example 2

The same procedures as in Comparative Example 1 were repeated by using 25 kg of pre-expanded particles shown in Table 2.

Then the inflammable gas was intended to be separated and recovered from the nitrogen gas which contained the inflammable blowing agent obtained in the extraction vessel, by using an activated charcoal absorption equipment, but could not be separated and recovered.

As is clear from the above-mentioned results, it is found that according to the methods of Examples 1 and 2, not less than 99% by weight of the inflammable blowing agent contained in the pre-expanded particles was extracted by the steam in a short period of time, namely, after a lapse of 20 minutes from starting of the feeding of steam.

Also it is found that according to the methods of Examples 1 and 2, the inflammable blowing agent can be separated and recovered at a high purity from the steam which contains the inflammable blowing agent obtained in the extraction vessel.

From the above fact, since the inflammable blowing agent has a high purity, it can be re-used when producing the pre-expanded particles.

INDUSTRIAL APPLICABILITY

According to the post-treatment method of polyolefin resin pre-expanded particles of the present invention, an inflammable blowing agent can be extracted efficiently and safely in a short period of time from the polyolefin resin pre-expanded particles foamed by using the inflammable blowing agent, and therefore, even if sparking occurs on the surface of the pre-expanded particles from which the inflammable blowing agent was already extracted, occurrence of ignition can be completely inhibited.

After the extraction of the inflammable blowing agent from the polyolefin resin pre-expanded particles by using steam, the inflammable blowing agent can be separated from steam and recovered at a high purity only by condensing and liquefying the steam containing the inflammable blowing agent, thus making it possible to re-use the inflammable blowing agent.

We claim:

1. A post-treatment method of polyolefin resin pre-expanded particles comprising:

introducing the polyolefin resin pre-expanded particles foamed by using an inflammable blowing agent into an extraction vessel filled with steam previously, feeding an additional steam into the extraction vessel;

extracting the inflammable blowing agent gas from the polyolefin resin pre-expanded particles;

discharging the resulting steam which contains the extracted inflammable blowing agent gas from the extraction vessel continuously or intermittently; and liquefying the steam to separate and recover the inflammable blowing agent gas.

2. The post-treatment method of polyolefin resin pre-expanded particles of claim 1, wherein said steam is a steam having an oxygen gas content of not more than 5% by volume.

* * * * *